Nov. 29, 1949     W. R. RAMBO     2,489,433
RADIO FREQUENCY COUPLING DEVICE
Filed Nov. 27, 1945

INVENTOR
WILLIAM R. RAMBO

ATTORNEY

Patented Nov. 29, 1949

2,489,433

UNITED STATES PATENT OFFICE 2,489,433

RADIO-FREQUENCY COUPLING DEVICE

William R. Rambo, Cambridge, Mass., assignor to the United States of America as represented by the Secretary of War Application November 27, 1945, Serial No. 631,187

2 Claims. (Cl. 178—44)

This invention relates generally to electric apparatus and more particularly to a method of coupling radio frequency energy from a coaxial type cavity.

While there have been developed many types of coupling devices, for exciting or extracting radio frequency energy from resonant cavities, such devices have been limited in their usefulness because of their inability to operate efficiently over wide ranges of frequencies.

It is an object of this invention to provide a method of transferring radio frequency energy between a coaxial cavity and a load or other device, operable over a wide range of frequencies.

Such a transfer of energy is accomplished by the use of a capacity probe in conjunction with a metal ring serving as a low reactance loop.

Figure 1:
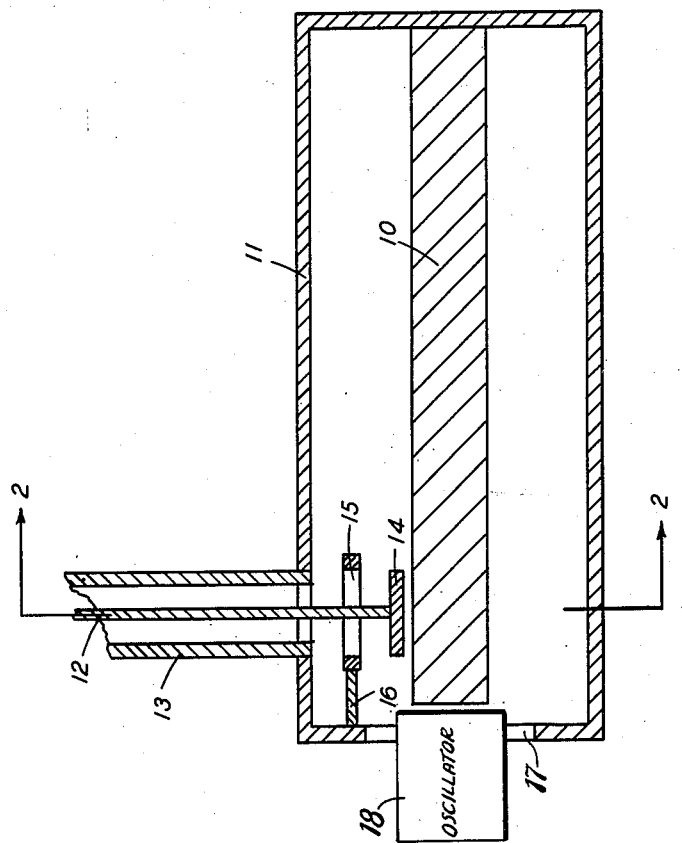
Figure 2:
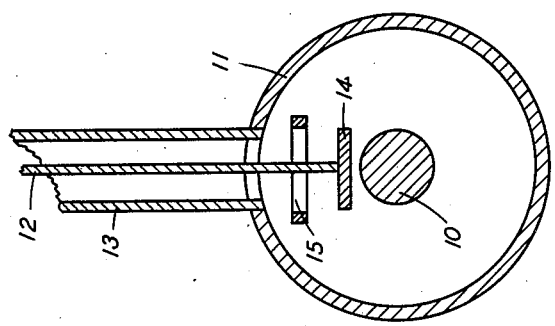

Other objects, features and advantages of this invention will suggest themselves to those skilled in the art and will become apparent from the following description of the invention taken in connection with the accompanying drawings in which:

Fig. 1 is a cross-section of a cavity and a coupling device utilizing the principles of this invention; and Fig. 2 is a sectional view of the same device taken at section 2, 2 of Fig. 1.

Referring now to the drawings, a coaxial cavity with an inner conductor 10 and an outer conductor 11 has coupled thereto a coaxial line with a moveable inner conductor 12 and an outer conductor 13. Moveable inner conductor 12 of the coaxial line is terminated at one end by a metallic disc 14. About moveable inner conductor 12 there is disposed a metallic annular ring 15 whose inner diameter is slightly greater than the diameter of disc 14 so that disc 14 may be encircled by ring 15 when inner conductor 12 of the coaxial line is moved in a direction along its longitudinal axis.

Annular ring 15 is supported by a metallic rod 16 which is electrically and mechanically attached to the end of the coaxial cavity near the opening 17 that is provided for the connection of oscillator 18.

Because the distribution of electric and magnetic fields within a resonant cavity is subject to change as the operating frequency is varied, it is generally impossible to pick up energy satisfactorily from the cavity over the entire tuning range of the oscillator cavity when either a simple capacity probe coupling device is employed or when a simple inductive coupling loop is used.

Because the impedance of a probe or a loop varies with the operating frequency, and the distribution of electric and magnetic fields within such a cavity varies with the operating frequency, a loop or a probe coupling device will transfer power efficiently only at or near a given operating frequency. In general, tuneable cavities have a frequency range far in excess of the frequency range over which a coupling loop or probe will satisfactorily operate.

The device of this invention has the characteristics of an adjustable capacity probe and also an adjustable inductive coupling loop.

At one range of operating frequencies the proximity of disc 14 to inner conductor 10 of the coaxial oscillator cavity permits proper loading of the oscillator cavity since disc 14 acts as a capacity probe. It should be noted that disc 14 and inner conductor 12 may be moved in a direction parallel to the longitudinal axis of conductor 12 to permit proper loading of the cavity.

At frequencies where the action of disc 14 as a capacity probe does not provide proper loading of the oscillator cavity, inner conductor 12 of the coaxial line may be withdrawn from the coaxial oscillator cavity until disc 14 is encircled by annular ring 15. In such a position disc 14 is substantially electrically integral with ring 15 since the inside diameter of ring 15 is but slightly larger than the diameter of disc 14, and therefore the capacitive reactance between disc 14 and ring 15 is of a low value. Accordingly, an inductive coupling loop is thus formed, consisting of inner conductor 12, disc 14, ring 15, and ring supporting rod 16 which is shorted at one end to the wall of the oscillator cavity. It should be noted that the total reactance of the coupling loop so formed can be varied by the longitudinal movement of inner conductor 12 which in turn moves disc 14 with respect to ring 15, resulting in a higher value of capacitive reactance between probe 14 and ring 15.

Thus two extremes have been shown. Any intermediate value of coupling may be obtained by inserting or withdrawing inner conductor 12 from the oscillator cavity whereby the proximity of disc 14 with respect to inner conductor 10 and ring 15 is determined.

While there has been here described what is at present considered to be the preferred embodiment of the invention, it will be obvious to those skilled in the art that various changes and modifications may be made therein without departing from the scope of the invention.

What is claimed is:

1. In a coaxial type oscillator cavity having an inner conductor and an outer conductor, a coaxial line having an inner conductor and an outer conductor associated with said cavity, a radio frequency energy coupling device including a capacity probe, said probe comprising a circular disc, said disc mechanically and electrically terminating said inner conductor of said line, an annular ring disposed within said coaxial cavity and spaced from both the inner and outer conductors, said ring having an inner diameter slightly larger than the diameter of said disc, means mechanically and electrically connecting said ring to said outer conductor of said cavity, said ring being concentric with said disc and said inner conductor of said line, and means for the translation of said disc with respect to said ring and said inner conductor of said cavity whereby the degree of coupling between said cavity and said line can be adjusted to accomplish efficient power transmission over a wide range of operating frequencies.

2. In a coaxial type oscillator cavity having an inner conductor and an outer conductor, a coaxial line having an inner conductor and an outer conductor associated with said cavity, a radio frequency energy coupling device including a capacity probe, said probe terminating said inner conductor of said line, an annular ring disposed within said coaxial cavity and spaced from both the inner and outer conductors, said ring having an inner diameter slightly greater than the diameter of said probe, said ring being concentric with said probe and said inner conductor of said line, means for connecting said ring to said outer conductor of said cavity, and means for the translation of said probe with respect to said ring and said inner conductor of said cavity whereby the degree of coupling between said cavity and said line can be adjusted to accomplish efficient power transmission over a wide range of operating frequencies.

WILLIAM R. RAMBO.

REFERENCES CITED

The following references are of record in the file of this patent:

UNITED STATES PATENTS

| Number | Name | Date |
|---|---|---|
| 2,311,520 | Clifford | Feb. 16, 1943 |
| 2,373,233 | Dow | Apr. 10, 1945 |
| 2,412,393 | Ghosh | Dec. 10, 1946 |
| 2,423,416 | Sontheimer | July 1, 1947 |
| 2,443,921 | Moe | June 22, 1948 |